(12) United States Patent
Misra

(10) Patent No.: US 8,197,890 B2
(45) Date of Patent: Jun. 12, 2012

(54) METHOD OF MAKING DENDRITIC MAGNETIC NANOSTRUCTURES

(75) Inventor: Devesh Kumar Misra, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 437 days.

(21) Appl. No.: 12/575,281

(22) Filed: Oct. 7, 2009

(65) Prior Publication Data

US 2010/0032609 A1 Feb. 11, 2010

Related U.S. Application Data

(60) Division of application No. 11/361,212, filed on Feb. 24, 2006, now Pat. No. 7,635,518, which is a continuation-in-part of application No. 11/051,273, filed on Feb. 4, 2005, now Pat. No. 7,504,130.

(51) Int. Cl.
*B05D 7/00* (2006.01)
*B05D 5/12* (2006.01)

(52) U.S. Cl. .................. 427/127; 427/212; 427/214

(58) Field of Classification Search .................. 427/212, 427/214
See application file for complete search history.

(56) References Cited

OTHER PUBLICATIONS

Kale et al. "Magnetic Behavior of Nanocrystalline Nickel Ferrite Synthesized by the Reverse Micelle Technique," J. Magnetism and Magnetic Mat, 277, pp. 350-358, 2004.*
Cao et al. "Single-Crystal Dendritic Micro-Pines of Magnetic alpha-Fe2O3: Large-Scale Synthesis, Formation, Mechanism and Properties," Jun. 7, 2005, Angew. Chem. Int. Ed., 44, pp. 2-6.*

* cited by examiner

*Primary Examiner* — Michael Cleveland
*Assistant Examiner* — Robert Vetere
(74) *Attorney, Agent, or Firm* — Pamela A. Baxter; Kean Miller LLP

(57) ABSTRACT

Magnetic nanostructures comprised of an assembly of magnetic nanorods held together by dipole forces in a dendritic pattern and their method of manufacture. The dendritic magnetic nanostructures are prepared at room temperature by applying a magnetic field to a reverse micelle system wherein at least one salt of a magnetic metal is being precipitated within the core of the reverse micelle.

17 Claims, 1 Drawing Sheet

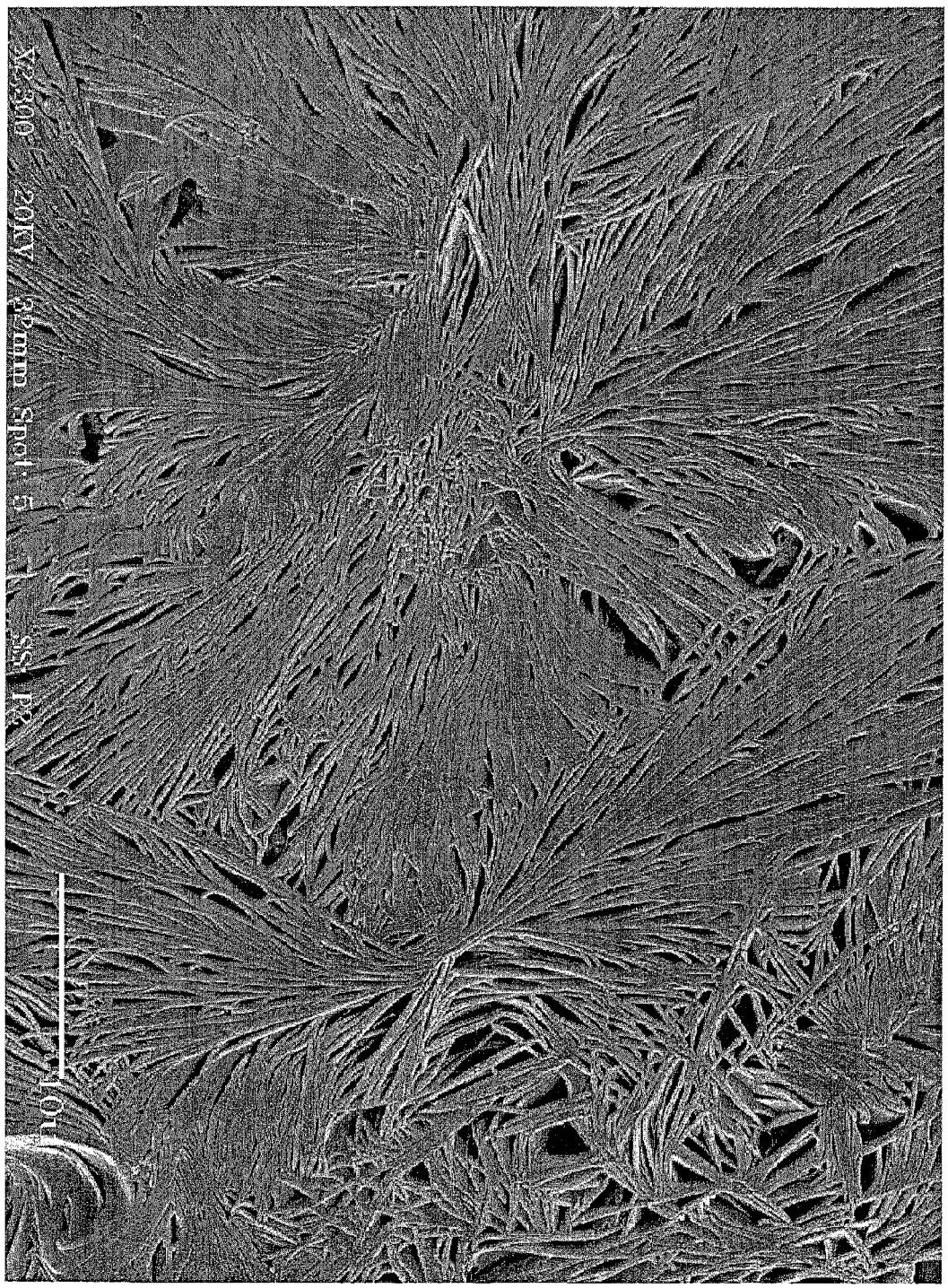

METHOD OF MAKING DENDRITIC MAGNETIC NANOSTRUCTURES

CROSS REFERENCE TO RELATED APPLICATIONS

This application is a divisional of U.S. Ser. No. 11/361,212, filed Feb. 24, 2006, which issued as U.S. Pat. No. 7,635,518 on Dec 22, 2009, which is a continuation-in-part of U.S. Ser. No. 11/051,273, , filed Feb. 4, 2005, , which issued as U.S. Pat. No. 7,504,130 on Mar. 17, 2009.

FIELD OF THE INVENTION

The present invention relates to magnetic nanostructures comprised of an assembly of magnetic nanorods held together by dipole forces in a dendritic pattern and their method of manufacture. The dendritic magnetic nanostructures are prepared at room temperature by applying a magnetic field to a reverse micelle system wherein at least one salt of a magnetic metal is being precipitated within the core of the reverse micelle.

BACKGROUND OF THE INVENTION

Quasi one-dimensional magnetic nanostructures, such as nanorods, nanowires, and nanotubes have attracted significant scientific and technological interest because they exhibit unique magnetic properties not displayed by their bulk or nanoparticle counterparts. Crystalline magnetic nanorods belong to this class of magnetic materials known for their spontaneous magnetization. There are multiple potential uses for such nanostructures, such as: their use for high density magnetic recording media; their use in sensors; their use in spintronic devices, and their use in drug delivery applications.

A variety of methods have been proposed for synthesizing various types of nanorods. These synthetic methods are typically anisotropic growth with the intrinsic anisotropic crystal structure in a solid material, anisotropic growth using tubular templates, and anisotropic growth kinetically controlled by super-saturation or by using an appropriate capping surfactant. Other approaches to fabricate one-dimensional nanostructures include thermal evaporation and template assisted growth, vapor phase transport process with the assistance of metal catalysts, hydrothermal methods, and electrospinning.

The synthesis of discrete one-dimensional magnetic (iron) nanorods was reported by Park, S. L. et al. using the process of oriented attachment of monodisperse spherical nanoparticles [Park, S. J. et al., "Synthesis and Magnetic Studies of Uniform Iron Nanorods and Nanospheres", J. Am. Chem. Soc. 2000, 122, 8581]. Puntes, V. F. et al. reported on the synthesis of cobalt nanodisks by means of thermal decomposition of the cobalt carbonyl precursors [Puntes, V. F. et al., "Colloidal Nanocrystal Shape and Size Control: The Case of Cobalt", Science 2001, 291, 2115]. Dumestre, F., et al. reported on the synthesis of cobalt nanorods [Dumestre, F. et al., "Shape Control of Thermodynamically Stable Cobalt Nanorods through Organometallic Chemistry," Angew, Chem. Int. Ed. 2002, 41, 4286], and Cordente, N. et al. reported on the synthesis of nickel nanorods by means of high-temperature reduction of organometallic complexes [Cordente, N. et al., "Synthesis and Magnetic Properties of Nickel Nanorods", Nano Lett., 2001, 1, 565.].

While the above mentioned processes have met with varying degrees of success, they all are faced with the same common problems associated with chemical and physical processes, such as high cost, aggregation and coarsening of particles at elevated temperatures, and shape control, all of which limits their applications. Thus, there is a need in the art not only for more efficient methods of producing magnetic nanostructures, but also for magnetic nanostructures having unique morphologies.

SUMMARY OF THE INVENTION

In accordance with the present invention there is provided a method for producing magnetic nanostructures comprised of an assembly of magnetic nanorods held together by dipole interaction in a dendritic pattern, which method comprising:

a) dissolving an effective amount of a surfactant into a non-polar organic solvent with sufficient mixing to cause the formation of a reverse micelle microemulsion;

b) dividing said reverse micelle microemulsion into a first fraction and a second fraction;

c) blending into said first fraction an aqueous solution having dissolved therein one or more metal salts wherein at least one of the metals has magnetic properties, thereby forming a metal salt microemulsion comprised of reverse micelles in a continuous non-polar organic phase, which reverse micelles are comprised of an aqueous core of metal salt solution encased in a surfactant shell;

d) blending into said second fraction an effective amount of an aqueous precipitating agent solution, thereby resulting in the formation of a precipitating agent microemulsion comprised of reverse micelles in a continuous non-polar organic phase, which reverse micelles are comprised of an aqueous core of precipitating agent solution encased in a surfactant shell;

e) simultaneously: (i) applying a magnetic field of effective strength; and (ii) blending at least a portion of the metal salt microemulsion with at least a portion of the precipitating agent microemulsion, thereby resulting in the simultaneous precipitation and formation of magnetic nanostructures comprised of an assembly of magnetic nanorods held together by dipole interaction in a dendritic pattern, which nanorods are comprised of a series of magnetic nanoparticles held together by dipole magnetic forces, in the aqueous core of said reverse micelles;

f) extracting at least a portion of the magnetic nanostructures with an effective amount of a $C_2$ to about a $C_6$ alcohol wherein the magnetic nanostructures migrate to the alcohol phase in the form of a colloidal dispersion alcohol phase;

g) separating the colloidal dispersion alcohol phase from the non-polar organic phase; and h) heating said colloidal dispersion alcohol phase of step g) above at an effective temperature for an effective amount of time to drive off at least a portion of any remaining water and surfactant, thereby resulting in substantially dried magnetic nanostructures comprised of assemblies of magnetic nanorods held together in a dendritic pattern by dipole interaction.

In a preferred embodiment, the surfactant is an anionic surfactant, preferably sodium-bis(2-ethylhexyl)sulfosuccinate and the non-polar organic solvent is isooctane.

In another preferred embodiment, the precipitating agent is ammonium hydroxide.

In still another preferred embodiment, the magnetic metal is selected from the group consisting of iron, cobalt, and nickel.

In another preferred embodiment a non-magnetic metal is present and is selected from the group consisting of copper, zinc, silver, gold, and platinum.

Also in accordance with the present invention there is provided a magnetic nanostructure comprised of an assembly of magnetic nanorods held together by in a dendritic pattern by dipole interaction, wherein each nanorod is comprised of a chain of nanoparticles, wherein each nanoparticle is comprised of at least one magnetic metal and at least one other element, which at least one other element is selected from both magnetic and non-magnetic elements, which nanoparticles are held together by magnetic forces.

In a preferred embodiment the nanoparticles are ferrites.

In another preferred embodiment the nanoparticles are nickel ferrites.

Also in accordance with the present invention the magnetic nanorods of the dendritic magnetic nanostructure have a titania dioxide coating.

BRIEF DESCRIPTION OF THE DRAWINGS

FIG. 1 is a photomicrograph of a nickel ferrite dendritic magnetic nanostructure of the present invention.

DETAILED DESCRIPTION OF THE INVENTION

The magnetic nanostructures of the present invention are comprised of an assembly of magnetic nanorods held together by dipole interaction in a dendritic type morphology or pattern. By dendritic pattern, or dendritic-type morphology, we mean that the nanorods of the nanostructure are arranged in a tree-like structure having one or more trunks and a plurality of branches, all of which are comprised of magnetic nanorods. Dendrites are well known in the art and are typically the tree-like structures, examples of which include crystals that grow as molten metal freezes; the tree-like structures that form during the freezing of many nonmetallic substances such as ice; and the like. Dendrites are sometimes referred to as having a "spiky" morphology.

Each nanorod of the dendritic magnetic nanostructure of the present invention is comprised of a chain of nanoparticles that are held together by dipole interaction during their formation by precipitation within the aqueous core of a reverse micelle when an effective magnetic field is applied. Each nanoparticle is comprised of at least two elements, one of which is a magnetic metal. The other one or more elements can be any that will combine with the at least one magnetic metal in substantially stoichiometric amounts, to form a nanoparticle having magnetic properties. Preferred magnetic metals are iron, nickel and cobalt with iron being the most preferred. The more preferred nanoparticles are ferrites with nickel ferrite being most preferred. At least one non-magnetic metal can be used in addition to the required at least one magnetic metal. Non-limiting examples of non-magnetic metals that can be used in the practice of the present invention include copper, zinc, silver, gold and platinum. Non-limiting examples of other preferred nanoparticles that can comprise the nanorods of the present invention include M-Au, M-Ag, M-Pt, M-Pd, M-Au—Pt, M-Sm, and Nd-M-B wherein M is a magnetic metal selected from iron, nickel and cobalt.

The magnetic dendritic nanostructures of the present invention are produced from reverse micelles. Reverse micelles and microemulsions are optically transparent, thermodynamically stable systems often containing dispersed aqueous droplets stabilized in a continuous nonpolar medium by surfactant shells. These aqueous droplets, also sometimes referred to as aqueous microdomains, or pools, within the micelle core (2 to 20 nanometers in diameter) have solvent properties that depend on such things as the molar water-to-surfactant ratio. At low molar water-to-surfactant ratio, for example less than about 10, the water in the core is highly structured because of association with the polar head group of the surfactant molecules. At higher molar water-to-surfactant ratios the micelles become swollen with a free water core having bulk water solvent characteristics. Reverse micelles and microemulsions can, in some respects, be visualized as submicroscopic aqueous reaction vessels into which water soluble species can be dissolved and reacted.

Any suitable reverse micelle system can be used in the practice of the present invention. Such systems are typically nonionic, anionic, or cationic. In the case of producing nanorods from $NiFe_2O_4$ nanoparticles, the preferred are the anionic systems; the more preferred anionic surfactants are sodium-bis(2-ethylhexyl)sulfosuccinate (AOT), di(1,3-dimethyl-butyl)sulfosuccinate, and diamylsulfo-succinate; with AOT being the most preferred. These surfactants are available commercially neat (dry) or in solution form (in alcohol or water) under the AEROSOL trademark of Cytec, Inc. of West Patterson, N.J. as AEROSOL-OT (AOT) or AEROSOL-GPG, AEROSOL-MA-80 (MA-80) and AEROSOL-AY (AY). In the case of producing Cobalt-Platinum nanorods wherein a cationic system is desired, then the most preferred cationic surfactant is cetyltrimethylammonium bromide (CTAB) or didodecyldimethylammonium bromide (DDAB).

The maximum amount of the surfactant and water comprising the two fractions is preferably up to about 50%, more preferably up to 30%, and most preferably up to about 20%, by weight of the total weight of the reverse micelle or reverse microemulsion systems. The amount of co-surfactant is preferably up to about 75%, and more preferably up to about 50%, and most preferably up to about 25%, by weight based on the total weight of the reverse micelle or reverse microemulsion systems.

A co-surfactant can also be used to facilitate the formation and stability of the reverse micelle microemulsion system. Co-surfactants, as well as the primary surfactants, will have a carbon number from about 8 to 20. Sodium alkyl sulfates are preferred, more preferred is SDS (sodium dodecyl sulfate).

As previously mentioned, the nanostructures of the present invention are produced by first forming a reverse micelle microemulsion wherein a suitable surfactant component, preferably a solid surfactant component, more preferably an anionic surfactant component, is mixed with a suitable non-polar organic solvent component. At least a fraction of the surfactant will dissolve in the non-polar solvent. The term "non-polar" is used herein to mean either a suitable non-polar solvent or a suitable low-polar solvent. Non-polar solvents are generally defined as solvents having a small dipole moment (preferably D<1) and a small dielectric constant (preferably e<5). The solvent portion typically comprises aromatic hydrocarbons such as toluene, butylbenzene, benzene; cycloalkanes such as cyclohexane; chlorinated hydrocarbons such as carbon tetrachloride and methylene chloride; and alkanes having up to 20 carbon atoms, and preferably up to 16 carbon atoms, such as hexane, octane, isooctane, decane, dodecane and hexadecane; and branched alkanes such as isooctane and dimethyl butane, or mixtures thereof. Preferred non-polar and low-polar solvents are the alkanes, with isooctane being the most preferred.

The two components are mixed with sufficient energy and for an effective amount of time to result in the formation of reverse micelles in a non-polar solvent continuous phase. When the surfactant is dissolved in the non-polar solvent, the hydrophobic end will tend to move to the surface of the solvent with the hydrophilic end protruding out of the solvent and in contact with air. When the surfactant concentration is increased to a level such that there are a large number of surfactant molecules on the surface of the non-polar solvent, these molecules will start forming reverse micelles, leading to a decrease in the surface tension. In the reverse micelle, the hydrophilic groups are in contact with each other and hence their interaction with the non-polar solvent molecules in minimized. The formation of reverse micelles continues with an increase in the surfactant concentration until a critical concentration is reached. After this point, the surface tension of the system becomes independent of the surfactant concentration, and only reverse micelles form. At this stage of the instant process, there is substantially no aqueous core within the reverse micelles.

This resulting reverse micelle in non-polar solvent mircoemulsion is preferably divided into a first fraction and a second fraction. It is preferred that the two fractions be substantially equal in volume. In one embodiment, an effective amount of an aqueous solution containing a dissolved water soluble salt of a magnetic metal and optionally, but preferably, at least one other dissolved water soluble salt of at least one other metal is added to the first fraction. The ratio of magnetic salt to the one or more other salts of the one or more other metals will be in a ratio to provide at least a stoichiometric amount of each metal, or element, that will result in the formation of a magnetic compound. It is more preferred that stoichiometric amounts of each be used. It is also preferred that one of the salts be a water soluble nickel salt and the other be a water soluble iron salt. Non-limiting examples of water soluble nickel and iron salts that are suitable for use in the present invention include the nitrates, sulfates and chlorates. Preferred are the chlorates. The most preferred metal salt is $NiCl_2.6H_2O$ and the most preferred iron salt is $FeCl_2.4H_2O$. The first fraction containing the metal salt solution is mixed with sufficient energy, preferably with sonication, for an effective amount of time, preferably from about 5 to 20 minutes, more preferably from about 10 to 15 minutes, to result in the formation of myriad aqueous microdomains, or reverse micelles, comprised of surfactant shells having an aqueous core in a continuous non-polar solvent phase, thus forming a metal salt microemulsion. That is, the reverse micelles now contain water in their interior into which the metal/iron salt solution has diffused.

An aqueous solution containing an effective amount of a suitable precipitating agent is added to the second fraction. Precipitating agents are well know to those having ordinary skill in the art the proper precipitating agent can easily be determined once it is determined what salts will be used to prepare the nanostructures of the present invention. A preferred precipitating agent when the salts are water soluble nickel and iron salts is ammonium hydroxide. This second fraction will also be agitated, preferably with the use of sonication, for an effective amount of time, preferably from about 5 to 20 minutes, more preferably from about 10 to 15 minutes. The aqueous precipitating agent solution will become the core of the reverse micelle with a surfactant shell, thus forming a precipitating agent microemulsion.

At least a portion of the metal salt microemulsion is blended, preferably at room temperature and with sufficient mixing for an effective amount of time, with at least a portion of the precipitating agent microemulsion and simultaneous with said blending a magnetic field of effective strength is applied, thereby resulting in the formation of nanorods comprised of nanoparticles of the water soluble salts which essentially join together to form an assembly magnetic nanorods. By room temperature we mean at a temperature at which a conventional production facility is kept. This temperature will typically range from about 20° C. to 25° C. (68° F. to 77° F.), preferably from about 21° to 23° C. (69° F. to 73° F.).

Also, the term "effective amount of time" for this blending step will be at least that amount of time which will allow the nanoparticles to precipitate and be held together by dipole interaction to form the nanorods that compose the nanostructures of dendritic pattern. This amount of time will typically be from about 30 minutes to about 60 minutes.

As mentioned above, the assembly of nanorods are held together by dipole interaction in a dendritic pattern. The terms "dipole interaction" and "dipole magnetic forces" are sometimes used interchangeably herein. Without the application of the magnetic field during the precipitation and formation of the magnetic nanoparticles, nanorods will not be formed. It is only when a magnetic field of effective strength is applied during the formation of the magnetic nanoparticles will the nanorods form, particularly in a dendritic pattern. By an "effective" magnetic field we mean at least that minimum amount of magnetic field that will cause the precipitating nanoparticles to form as nanorods, but not so strong as to cause the nanorods to merge together in a bundle and not a dendritic pattern. The "effective" strength of the magnetic field will range from about 500 Oested to about 2,000 Oested, preferably from about 800 Orested to about 1,000 Oested.

Although not preferred, it is within the scope of this invention that the reverse micelle microemulsion not be divided into a first fraction and a second fraction, but that the aqueous metal salt solutions and the aqueous precipitating agent solution both be added, either in sequence, or simultaneously, into the initial reverse micelle microemulsion. This of course must be done simultaneously with the application of the magnetic field of effective strength. It is preferred to divide the reverse micelle microemulsion into two fractions because it enables better control over more uniform size distribution and shape of the resulting magnetic nanorods.

The resulting magnetic nanostructures are extracted by use of at least one suitable polar organic solvent, such as an alcohol, ketone or mixtures thereof. Suitable alcohols for use in the present invention are those having from about 1 to about 6 carbon atoms, preferably from about 1 to about 3 carbon atoms. The most preferred alcohol is methanol. It is also preferred that a mixture at least one alcohol and at least one ketone be used, more preferably a mixture of methanol and acetone An effective amount of the polar organic solvent is added to the product microemulsion to form a two phase system, one phase being the polar organic solvent phase and the other phase being the non-polar solvent phase. The nanorod-containing reverse micelles will migrate into the polar organic solvent phase. The non-polar solvent phase is then physically separated, such as by decanting, from the polar organic solvent phase. Any remaining surfactant can be removed from the magnetic nanorods by sequentially washing with organic solvent, preferably a mixture of methanol and acetone, then with water until substantially all surfactant and any remaining water soluble contaminants are removed.

The resulting product can be heated at relatively low temperatures at suitable conditions which include pressures from about $10^{-1}$ Torr to about $10^{-2}$ Torr and temperatures of about 50° C. to about 100° C., preferably from about 80° C. to about 90° C. for an effective amount of time. This effective amount of time will be from about 2 to 20 minutes, preferably from about 5 to 15 minutes and more preferably from about 5 to 10 minutes. At least a portion, preferably substantially all, remaining surfactant will be driven-off during this step.

It is also within the scope of this invention that the magnetic nanostructures have a photocatalytic outer coating, or shell, of titania. This can be accomplished by blending a suitable water-soluble titanium salt in an aqueous acidic solution after the blending of the magnetic metal salt microemulsion and precipitating agent microemulsion, which is simultaneous with the application of the magnetic field. The preferred water soluble titanium salt is $TiCl_4$ and the preferred aqueous acidic solution in HCl. It is preferred that the acid solution have a pH of about 0 to 3. Acidic hydrolysis of $TiCl_4$ will occur, thus forming $TiOCl_2$. At least a fraction of the $TiOCl_2$ solution is added to the magnetic metal microemulsion. These titania coated magnetic nanostructures will be suitable for use in biomedical applications because the photocatalytic properties of the titania can be exploited for antimicrobial, or germicidal, activity. The magnetic properties of the nanorods are used to remove the titania coated nanostructures, when applied to the human body, such as when applied to a wound.

The present invention will be better understood with reference to the following example.

Example 1

A first microemulsion comprised of 2 ml of 30% ammonium hydroxide plus 2.4 ml of water plus 66 ml of 0.50M AOT-isooctane and a second microemulsion comprised of 0.384 g of $FeSO_4.7H_2O$ and 0.192 of $NiSO_4.6H_2O$ dissolved in 8 ml water plus 66 ml of AOT-isooctane were prepared. Also prepared was a reactant salt solution comprised of hydrated iron sulfate and hydrated nickel sulfate in stoichiometric quantities according to the product, $NiFe_2O_4$ (i.e., $[Fe^{+2}]/[Ni^{+2}]=2$). Ammonium hydroxide is the precipitating agent in the first microemulsion. The two microemulsions were blended together and subjected to rapid mechanical stirring while under the influence of a magnetic field. The strength of the magnetic field was about 1000 Orested. Magnetic nanorods comprised of nickel ferrite were precipitated in a dendritic pattern within the water pools of reverse micelles.

The Figure hereof shows the architectural transformation of nanoparticles of nickel ferrite to nickel ferrite nanorods with the application of the magnetic field to the reverse micelle system during precipitation of the nanoparticles. The diameter of the nickel ferrite nanorods was approximately 200-250 nanometers and the length of the nanorods was greater than 100 micrometers, however, these measurements are not intended to limit the scope of the invention. It is noted that the constitution or composition of reverse micelles were identical in the absence and presence of magnetic field (i.e. water/surfactant ratio was maintained at 10). The magnetization loops of nanocrystals depends on their size, shape and orientation of applied magnetic field. A comparison of the magnetization behavior of the resulting the nickel ferrite nanoparticles and nanorods indicated that the magnetic behaviour of nanorods was clearly different than that of nanoparticles of which they are composed. While at 300° K., nanoparticles appear superparamagnetic and nanorods paramagnetic, at 2° K. the nanoparticles indicate a high remanence and a low coercivity, but the nanorods had a low remanence, a very large saturation field, and possible superparamagnetism. More importantly, the nanorods exhibited a high coercivity of ~1100 Oe as compared to nanoparticles with coercivity of ~400 Oe. The higher coercivity of nanorods may be due to a higher shape anisotropy (the magnetization of a nanorod tends to be strongly axial).

There are of course other alternate embodiments which are encompassed in the foregoing descriptions of the invention, which are intended to be included within the scope of the invention, as defined by the following claims.

The invention claimed is:

1. A method for producing magnetic nanostructures comprised of an assembly of magnetic nanorods held together by dipole interaction in a dendritic pattern, which method comprising:
    a) dissolving an effective amount of a surfactant into a non-polar organic solvent with sufficient mixing to cause the formation of a reverse micelle microemulsion;
    b) dividing said reverse micelle microemulsion into a first fraction and a second fraction;
    c) blending into said first fraction an aqueous solution having dissolved therein one or more metal salts wherein at least one of the metals has magnetic properties, thereby forming a metal salt microemulsion comprised of reverse micelles in a continuous non-polar organic phase, which reverse micelles are comprised of an aqueous core of metal salt solution encased in a surfactant shell;
    d) blending into said second fraction an effective amount of an aqueous precipitating agent solution, thereby resulting in the formation of a precipitating agent microemulsion comprised of reverse micelles in a continuous non-polar organic phase, which reverse micelles are comprised of an aqueous core of precipitating agent solution encased in a surfactant shell;
    e) simultaneously: (i) applying a magnetic field of effective strength; and (ii) blending at least a portion of the metal salt microemulsion with at least a portion of the precipitating agent microemulsion, thereby resulting in the simultaneous precipitation and formation of magnetic nanostructures comprised of an assembly of magnetic nanorods held together by dipole interaction in a dendritic pattern, which nanorods are comprised of a series of magnetic nanoparticles held together by dipole magnetic forces, in the aqueous core of said reverse micelles;
    f) extracting at least a portion of the magnetic nanostructures with an effective amount of a polar organic solvent wherein the magnetic nanostructures migrate to the polar organic solvent phase in the form of a colloidal dispersion polar organic solvent phase;
    g) separating the colloidal dispersion polar organic solvent phase from the non-polar solvent phase;
    h) heating said colloidal dispersion polar organic solvent phase of step g) above at an effective temperature for an effective amount of time to drive off at least a portion of any remaining water and surfactant, thereby resulting in substantially dried magnetic nanostructures comprised of assemblies of magnetic nanorods held together in a dendritic pattern by dipole interaction; and
    i) collecting the resulting dendritic magnetic nanostructure product.

2. The method of claim 1 wherein the magnetic metal is selected from the group consisting of iron, nickel and cobalt.

3. The method of claim 2 wherein the magnetic metal is selected from iron and nickel.

4. The method of claim 3 wherein the magnetic metal is iron.

5. The method of claim 2 wherein the anionic surfactant is selected from the group consisting of sodium-bis(2-ethylhexyl)sulfosuccinate, di(1,3-dimethyl-butyl)-sulfosuccinate, and diamylsulfo-succinate.

6. The method of claim 1 wherein a non-magnetic metal is also present and is selected from the group consisting of copper, zinc, silver, gold and platinum.

7. The method of claim 1 wherein an aqueous solution of an iron salt and a nickel salt are blended with the first fraction.

8. The method of claim 1 wherein the surfactant is an anionic surfactant.

9. The method of claim 1 wherein the surfactant is a cationic surfactant.

10. The method of claim 9 wherein the cationic surfactant is selected from the group consisting of didodecyldimethylammonium bromide and cetyltrimethylammonium bromide.

11. The method of claim 1 wherein the non-polar solvent is selected from the group consisting of benzene, alkylbenzenes, alkanes, chlorinated alkanes, and cycloalkanes, wherein the carbon number of said non-polar solvents does not exceed 20.

12. The method of claim 11 wherein the non-polar solvent is an alkane.

13. The method of claim 12 wherein the non-polar solvent is selected from the group consisting of hexane, octane, isooctane, decane, dodecane, hexadecane and mixtures thereof.

14. The method of claim 13 wherein the non-polar solvent is isooctane and the surfactant is sodium-bis(2-ethylhexyl) sulfosuccinate.

15. The method of claim 1 wherein the polar organic solvent is selected from $C_1$ to $C_6$ alcohols and ketones.

16. The method of claim 15 wherein the polar organic solvent is selected from $C_1$ to $C_6$ alcohols and ketones.

17. The method of claim 16 wherein the polar organic solvent is a mixture of methanol and acetone.

* * * * *